United States Patent [19]

Halvorsen et al.

[11] 4,043,488
[45] Aug. 23, 1977

[54] BIN WITH DISCHARGE DEVICE

[75] Inventors: Tor Svein Halvorsen; Oddmund Saxlund, both of Weinberg, Germany

[73] Assignee: Astrid Alice Saxlund nee Erichsen, Heidberg, Germany

[21] Appl. No.: 521,782

[22] Filed: Nov. 7, 1974

[30] Foreign Application Priority Data

Jan. 7, 1974 Germany ............................ 2400547
Nov. 9, 1973 Germany ............................ 2356161

[51] Int. Cl.² .......................................... G01F 13/00
[52] U.S. Cl. .................................... 222/233; 222/234
[58] Field of Search ............... 222/196, 199, 200, 226, 222/227, 228, 233–241, 243–246; 259/2; 214/17 DA

[56] References Cited

U.S. PATENT DOCUMENTS

| 2,726,792 | 12/1955 | Seymour | 222/199 |
| 3,400,861 | 9/1968 | Pearl | 222/227 |
| 3,435,993 | 4/1969 | Aunmel | 222/200 X |

Primary Examiner—Robert B. Reeves
Assistant Examiner—H. Grant Skaggs
Attorney, Agent, or Firm—Whittemore, Hulbert & Belknap

[57] ABSTRACT

A bin having an essentially round or polygonal cross section with a discharge device, especially for flour, shaving or chip-type goods, such as wood shavings, sawdust, wood chips or the like, including a bin floor with at least one discharge opening channel underneath it for a conveyor worm or the like conveyor element in the channel and a drivable supporting body situated above the bin floor including pusher type discharge elements, at least some of which are limited on one longitudinal side by a carrier edge directed steeply to the bin floor, which pusher type discharge elements and supporting body form an essentially rigid unit of an outline conforming to the cross section of the bin, and a reversing drive for the rigid unit for alternately driving it in opposite directions.

14 Claims, 6 Drawing Figures

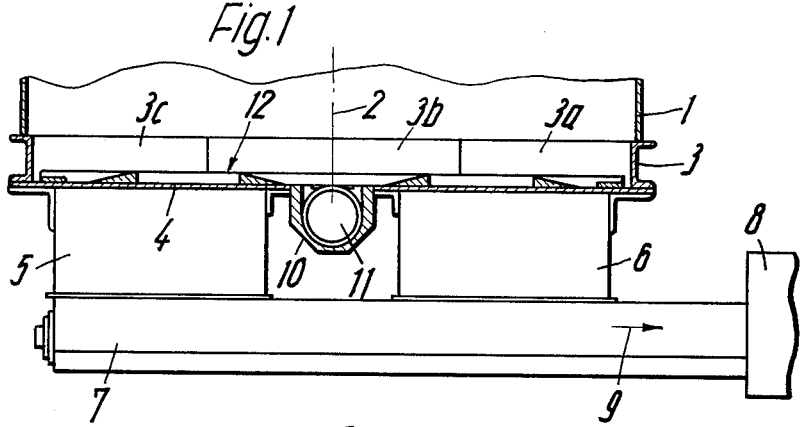
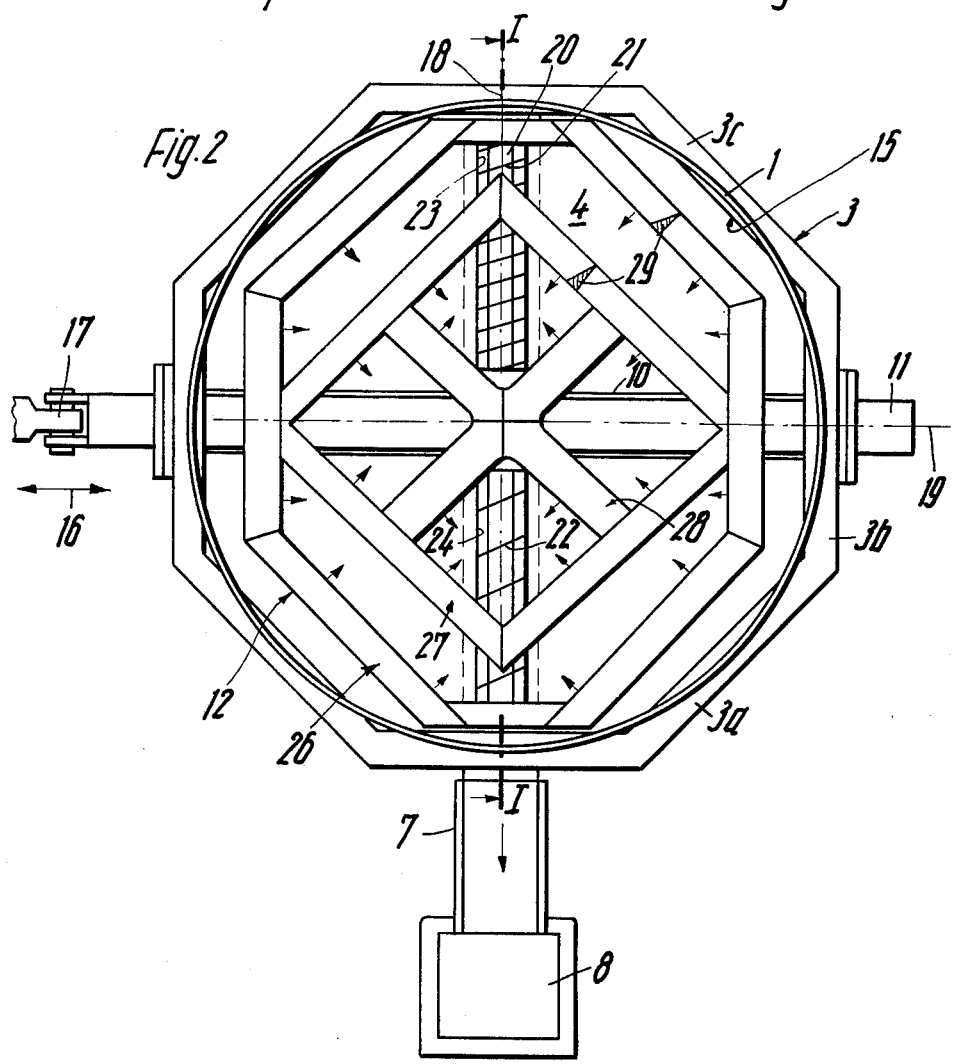

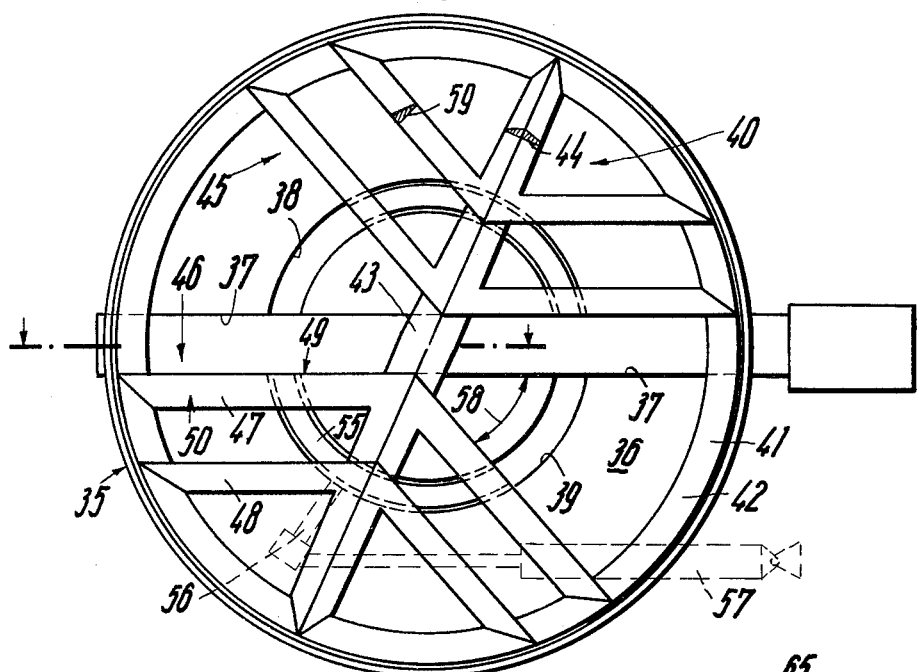
Fig. 3
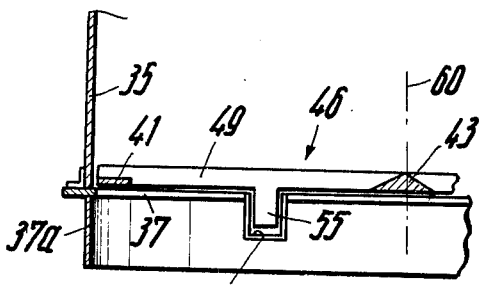
Fig. 4
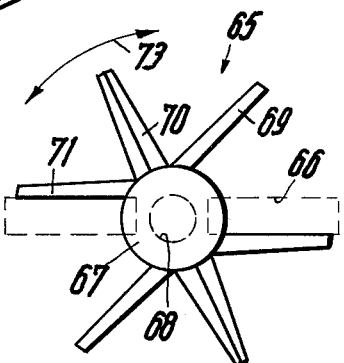
Fig. 6
Fig. 5

BIN WITH DISCHARGE DEVICE

The invention concerns a bin with discharge device, particularly for flour-, shaving- or chip-type type goods, such as wood shavings, wood chips or the like, with a bin floor with underneath it at least one discharge opening designed channel with conveyer worm or like conveyer elements and a drivable supporting body situated above the bin floor for pusher type discharge elements, at least some of which are limited on one longitudinal side by a carrier edge directed steeply toward the bin floor, whereby the bin has round or polygonal cross-section.

Bin discharge devices for rectangular or square bins are known, where the bin floor is constructed as push feeder floor. For this purpose several adjacent lying and oppositely movable ladder-type conveying elements are arranged, the rungs of which are constructed as carriers conveying in a movement direction of the ladders, occasionally also designed oblique to the conveying direction. Pressure medium thrust pistons can serve as driving force. On the discharge side of the bin a conveyer device is provided, for instance a conveyer worm designed in a channel, or the like. The advantage of this push discharge floor is in that from the column of material stored in the bin material is always carried out evenly across the entire bin cross-section, so that the material can settle down more or less evenly. However, this design can essentially only be used for square or rectangular bins. These have other disadvantages of importance in practical application.

For bins with essentially circular cross-section it is known to have a rotor-shaped discharge element designed in the center of the bin floor. This consists of a central body, on which in circumferential spaced apart locations elastically yielding leaf springs or elastically sluable, radically protruding rigid arms are mounted. These discharge rotors have proven themselves well, but in their construction and their operation they are relatively expensive.

It is the task of this invention to develop a bin with discharge device of the earlier more closely described type in such manner, that with an especially simple construction of the discharge device an even and particularly economical discharge across the entire cross-section of a round, circular, or polygonal bin is warranted, without the danger of compression of the material in pre-determined zones of the bin, and this with a high discharge capacity.

According to the invention this task is solved in that with round or polygonal cross-section of the bin the sliding type discharge elements and the support body form an essentially rigid unit in the shape of the contour of the cross-section of the bin.

In suitable manner the discharge pusher forms a compact framework.

Thereby it is suitably possible, in spite of the round or polygonal cross-section of the bin, that the discharge pusher can be driven by means of reverse drive either along a linear path or along a partial circle path alternating in opposite rotational direction. In the latter named event the part-circle of motion of at least one discharge element ends on one side on the level of a floor opening of the bin.

Thereby the discharge pusher can instead of a compact framework also be constructed in the manner of a star-shape. In each event the discharge elements and support bodies form a rigid unit, which executes simple back and forth alternating motions linear respective along circular arc sections. This makes the construction as well as the drive of this unit extraordinarily simple. The design can be constructed to be very robust and is even in hard usage very trouble-free. Particularly, in this manner a dependable discharge from the bin extending across the entire cross section can be achieved, without dead corners or bridge formations occurring and without the material being compacted locally to an undesirable degree.

The invention is explained in more detail with the aid of schematic drawings and several forms of construction.

It shows:

FIG. 1 the lower section of a bin with a discharge device according to a first form of construction of the invention in vertical cross-section, FIG. 2 a top-view onto the layout according to FIG. 1, FIG. 3 a similar presentation as in FIG. 2, the top-view onto a second form of construction of the invention, FIG. 4 a vertical part-section along the cutting line indicated dash-dotted in FIG. 3, FIG. 5 a view onto the device according to FIG. 3 from below, and FIG. 6 the preferred design of a third form of construction of the discharge device according to the invention.

With all forms of construction the bin has a circular cross-section. For the purpose of the invention it can, however, also have another round or polygonal cross-section.

With the form of construction according to FIGS. 1 and 2 the bin 1, the axis of which is designated 2, rests with its lower end on an octagonal frame 3, which, for example, consists of linear U-iron sections 3a–3c. The outer cylindrical addendum envelope of the frame 3 is somewhat larger and the inner cylindrical addendum envelope somewhat smaller than the bin 1. The frame 3 limits with its inner edge 15 an area, across which the yet to be described discharge element can be pushed in linear manner. This area is somewhat larger than the cross-section of the bin. This area is, in relation to the cross-section area of the bin, chosen in such manner, that with the discharge element to be described a complete discharge of the bin is possible.

In the presented form of construction the frame 3 is set onto the bin floor 4. This has two discharge openings 23 and 24 arranged diametrically along a diameter. Intermediate chutes are downward to these. The lower ends of the intermediate chutes are connected by a common discharge channel 7, which extends beyond the diameter of the bin assigned to which is a conveyer worm working in the channel 7 in the direction of the arrow 9. The axis of the conveyer worm is designated 18 and the worm shaft 20. The conveyer worm is designated 18 and the worm shaft 20. The conveyer blades 21 of the worm in the area of the discharge opening 23 have lesser, and the conveyer blades 22 in the area of the discharge opening have a greater degree of steepness. The construction is designed in such a way that the conveyer worm can carry off the material falling out of both discharge openings evenly and without clogging in the direction of the arrow 9.

Along another diameter of the bin extends a guide channel 10, which is open at the top, for a hollow cylindrical push rod 11 of circular cross-section, the axis of which is designated 19. The freely slidable push rod 11 is coupled to a driving device, in particular a thrust piston motor, which can push the rod in the direction of the double arrow 16 back and forth, at 17. The axis of the guide channel and the conveyer channel cross in the example shown in the axis 2 of the bin.

To the push rod 11 a discharge element 12 is rigidly connected, which is situated directly on respective with slight space above the bin floor 4. The push rod 11 and the discharge element 12 together form an agitating discharge pusher. In the shown example the discharge element 12 forms a compact rigid frame, which is essentially fitted to the cross-section of the bin respective the cross-section of the frame 3.

In the example according to FIGS. 1 and 2 the discharge element 12 has an essentially octagonal outer frame of discharge rods 26 and an essentially square inner frame of discharge rods 27, in which a cross-shaped frame element is arranged. The cross-section shapes of the individual frame sections are indicated in FIG. 2 by the section-lined area 29 and in FIG. 1 by the section-lined areas. The short planes running about vertical toward the bin floor 4 form therewith the carrier planes of the frame elements. The conveyer direction of the frame elements during the alternating movement of the discharge element are indicated in FIG. 2 by short arrows. The plane extending to the floor 4 at an acute angle is chosen in such manner, that in movement of the frame section in a direction away from the discharge plane the frame section can slide under the material resting on the floor without friction worth mention.

Since the frame essentially fills the bin surface, the movements of the discharge frame are only short. Yet an even and uninterrupted movement of the material also from the marginal areas of the bin up to the discharge opening is warranted. The evacuation of the lower layer of the material occurs thereby in every instance automatically in with great effectiveness. This warrants a steady and even filling of the blades of the discharge worm, which therefore works with great efficiency and accurately controllable volumetric discharge of the material at the discharge end. The rigid construction of the discharge element results in a very robust design with little susceptibility to trouble, which can be manufactured simply and inexpensively. In the form of construction according to FIGS. 3-5 a bin 35 of circular cross-section is provided, which rests on a frame not shown. On the bin floor 36 rests a discharge device in the form of a compact frame 40, which also has a circular cross-section closely fitted to the cross-section of the bin. Along a diameter extends in the bin floor a continuous discharge opening 37, which is connected via a drop chute 37a with a discharge channel or the like, not shown. Additionally, two part-circle channels 38, 39 in the bin floor are provided, in which part-circle bar shaped push-rod elements 55 engage, through which the discharge frame 40 is guided movably on the bin floor 36. The latticed discharge frame 40 consists essentially of two double arrow shaped discharge sections or groups 45 and 46. Each arrow shaped section of the frame has discharge rods 47, 48 which has a cross-section shown at 59 section-lined, with a short steep carrier surface 49 directed perpendicular to the bin floor 36 and a flat surface 48 running at an acute angle to the bin floor 36. The two double arrow like discharge sections are connected with each other by a diametrically running section 43 of roof-shaped cross-section 44 and by an outer ring part 41 with flat cross-section 42. On the one push-rod 55 via an arm 56 a thrust piston motor 57 engages, which moves the rigid unit back and forth across an angle sector, which is limited through the position shown in FIG. 3, in which the in-FIG. 3-at-an-angle-to-the-floor-opening-37 running section of the inner arrow in like manner aligns with the edge of the floor opening 37, as this is shown for the other section in FIG. 3. The push-rod 55 and frame 40 together form an agitating discharge pusher. The manner of operation is similar as the manner of operation with the form of construction according to FIGS. 1 and 2, that is, the rigid frame executes short alternate movements in circumferential direction and can thereby evacuate the material extraordinarily efficient and evenly from the entire bin cross-section through the floor opening 37 into the discharge channel, which thereby remains evenly and completely filled.

The form of construction according to the FIGS. 3-5 can be altered in that with each discharge section the radially further outlying arrow-elements and the closed outer connecting ring are omitted.

An example for this is shown in FIG. 6. Here too the discharge element is a rigid unit consisting of two discharge sections of arrow-shape. The arrow-shaped section is shown in the form of construction according to FIG. 6 by the arms 69 and 71. The unit 65 has, like the form of construction according to FIGS. 3-5 also a diametrically running intermediary arm 70 of roof-shaped cross-section. The two discharge sections are connected via the diametrical arm 70 with a bearing support 68, on which a thrust piston motor engages for the execution of alternating movements corresponding to the double arrow 73 across a limited angle section. The central section can be covered by a cone-shaped or other cover section extending into the bin, or a hood 67. The discharge openings in the bin floor are indicated at 66 with dash lines.

The arrow shaped arms 69 and 71 can also be designed curved in the respective discharge direction, which is shown by the short steep edge of the arms. It is also possible, with four discharge openings running at a right angle, to reduce the pitch angle between the arms 69 and 71 to an acute angle and to omit the center arm 70. In this event it is, however, practical to combine the four arrow-shaped discharge sections into one rigid unit.

The size of the area of the angle of rotation of the rigid unit depends on the size of the bin and the number of floor openings distributed in circumferential direction, to each of which a conveyer channel or the like is assigned. Likewise the number of the arrow shaped discharge sections depends on the size of the bin and the type of material.

We claim:

1. A bin with a discharge worm device, especially for flour, shaving or chip-type goods, such as wood shavings, sawdust, wood-chips or the like, with a bin floor having at least one diameter and at least one discharge opening extending along the one diameter, a channel underneath the discharge opening containing the discharge worm device, and a drivable agitating discharge pusher above said bin floor drivable substantial distances in opposite directions in a horizontal plane characterized in that the agitating pusher comprises several rigid discharge rods being supported flatwise directly upon said bin floor and having a discharge face at one longitudinal side directed perpendicularly to said bin floor and a sloping face at the opposite longitudinal side extending backwardly and to the bin floor at an acute angle, and a reversing drive for driving the pusher alternately in opposite directions to such an extent that the agitating pusher on each stroke sweep generally along the total upper surface of the bin floor, the pusher comprising two groups of discharge rods with the discharge faces of different rods in each group being directed in opposite directions.

2. Bin according to claim 1, characterized by the fact that the discharge pusher forms a compact framework.

3. Bin according to claim 1, wherein the bin is essentially polygonal in cross section, characterized by the fact that the discharge pusher is essentially polygonal in outline and can be driven alternately in opposite directions via reversing drive and push rod along a linear path.

4. Bin according to claim 1, wherein the bin is essentially round in cross section, characterized by the fact, that the discharge pusher is also essentially round and can be driven via the reversing drive along a part circle path alternately in opposite directions, whereby the part-circle of motion of at least one discharge element ends at the edge of a floor opening.

5. Bin according to claim 4, characterized by the fact that at least one element of the discharge pusher extending along a diameter of the bin cross-section has an about roof-shaped cross-section.

6. Bin according to claim 1, characterized by the fact that most of the discharge rods of the discharge pusher have a carrier surface turned toward the floor opening, running about vertical to the bin floor and on the far side a plane slightly sloped toward the bin floor.

7. Bin according to claim 1, characterized by the fact that the agitating pusher lies with at least some discharge rods flat on the bin floor.

8. Bin according to claim 1, characterized by the fact that the plane which the agitating pusher sweeps over during its alternating movement, is at least equal to the cross-section plane of the bin.

9. Bin according to claim 8, characterized by the fact that agitating pusher consists of an outer octagonal frame part of an inner, square frame part running concentric thereto, which is partially reinforced by about radial running frame parts.

10. Bin according to claim 8, characterized by the fact that agitating pusher has at least two arrow type discharge sections pointing to the axis of the bin.

11. Bin according to claim 10, characterized by the fact, that the two or more arrow type discharge sections are simply rigidly connected with each other via a central carrying section serving as support.

12. Bin according to claim 10, characterized by the fact that to each two arrow type discharge sections diametrically opposite each other an intermediate section of roof-shaped cross-section, running along a diameter, is assigned.

13. A bin with a discharge worm device, especially for flour, shaving or chip-type goods, such as wood shavings, sawdust, wood chips or the like, with a bin floor having at least one diameter and at least one discharge opening extending along the one diameter, a channel underneath the discharge opening containing the discharge worm device, and a drivable agitating pusher above said bin floor drivable in opposite directions in a horizontal plane characterized in that the agitating pusher comprises several rigid discharge rods being supported flatwise directly upon said bin floor and having a discharge face at one longitudinal side directed perpendicularly to said bin floor, and a sloping face at the opposite longitudinal side extending backwardly and to the bin floor at an acute angle, and a reversing drive for driving the pusher alternately in opposite directions to such an extent that the agitating pusher on each stroke sweep generally along the total upper surface of the bin floor, the pusher comprising two groups of discharge rods on either side of the discharge opening with the discharge faces of different rods in each group being directed in opposite directions, guide channels in the floor of the bin and push rods, in the guide channels connected to the rigid discharge rods for guiding the rigid discharge rods along its path.

14. Bin according to claim 13, characterized by the fact that the guide channels are open toward the discharge openings of the bin.

* * * * *